(12) United States Patent
Authier

(10) Patent No.: US 7,619,181 B2
(45) Date of Patent: Nov. 17, 2009

(54) HEATING SYSTEM FOR BATHING UNIT

(75) Inventor: Michel Authier, St-Augustin de Desmaures (CA)

(73) Assignee: Gecko Alliance Group Inc., Quebec (CA)

( * ) Notice: Subject to any disclaimer, the term of this patent is extended or adjusted under 35 U.S.C. 154(b) by 158 days.

(21) Appl. No.: 11/415,229

(22) Filed: May 2, 2006

(65) Prior Publication Data

US 2007/0012678 A1 Jan. 18, 2007

Related U.S. Application Data

(60) Provisional application No. 60/697,980, filed on Jul. 12, 2005.

(51) Int. Cl.
*H05B 1/00* (2006.01)
*H05K 7/20* (2006.01)

(52) U.S. Cl. .................. 219/219; 219/494; 219/497; 219/483; 219/484; 219/486; 219/481; 219/506; 219/519; 219/517; 361/720; 361/722; 361/748; 361/730; 361/752; 361/630; 361/627; 361/833; 361/781; 361/791; 307/38; 307/40; 307/42; 307/47; 307/117; 126/561; 126/562; 126/609; 126/210

(58) Field of Classification Search .................. None
See application file for complete search history.

(56) References Cited

U.S. PATENT DOCUMENTS

| | | | |
|---|---|---|---|
| 3,965,972 A | 6/1976 | Petersen | |
| 4,081,289 A | 3/1978 | Campbell, III | |
| 4,172,740 A | 10/1979 | Campbell, III | |
| 4,191,329 A | 3/1980 | Geaslin | |
| 4,322,297 A * | 3/1982 | Bajka | .................. 210/742 |
| 4,343,293 A | 8/1982 | Thomason et al. | |
| 4,353,412 A | 10/1982 | Krumhansl | |
| 4,383,340 A | 5/1983 | Braun, Jr. | |
| 4,459,971 A | 7/1984 | Bieri et al. | |
| 4,621,613 A | 11/1986 | Krumhansl | |
| 4,660,545 A | 4/1987 | Ely | |
| 4,744,112 A | 5/1988 | Keesling, Jr. | |
| 4,823,771 A | 4/1989 | Menning | |
| 5,601,074 A | 2/1997 | Eckart | |
| 5,710,409 A | 1/1998 | Schwarzbäcker et al. | |
| 6,355,913 B1 | 3/2002 | Authier et al. | |
| 6,363,928 B1 * | 4/2002 | Anderson, Jr. | ............... 126/577 |
| 6,476,363 B1 | 11/2002 | Authier et al. | |
| 6,488,408 B1 | 12/2002 | Laflamme et al. | |
| 6,526,965 B1 | 3/2003 | Devore | |
| 6,717,050 B2 | 4/2004 | Laflamme et al. | |

(Continued)

*Primary Examiner*—Shawntina Fuqua

(57) ABSTRACT

A control system suitable for use with a bathing unit system having a water receptacle is provided. The control system comprises a heating module, a power source and a controller in communication with the heating module and the power source. The power source includes an energy storage member for storing energy collected from a solar panel, and is operative for supplying power generated from solar energy to the heating module. The controller is operative for causing the power source to supply power to the heating module at least in part based on first information derived from a temperature of the water within the water receptacle and second information derived from a condition associated with the power source. The controller is further operative for selecting between a first power source and a second power source for supplying power to the heating module.

18 Claims, 6 Drawing Sheets

U.S. PATENT DOCUMENTS

| | | |
|---|---|---|
| 6,744,223 B2 | 6/2004 | Laflamme et al. |
| 6,782,309 B2 | 8/2004 | Laflamme et al. |
| 6,813,575 B2 | 11/2004 | Laflamme |
| 6,874,175 B2 | 4/2005 | Laflamme et al. |
| 6,900,736 B2 | 5/2005 | Crumb |
| 6,929,516 B2 | 8/2005 | Brochu et al. |
| 6,942,354 B2 | 9/2005 | Metayer et al. |
| 7,130,719 B2 * | 10/2006 | Ehlers et al. ................. 700/276 |
| 2004/0230344 A1 | 11/2004 | Gallupe et al. |

* cited by examiner

HEATING SYSTEM FOR BATHING UNIT

CROSS-REFERENCE TO RELATED APPLICATION

This application claims the benefit under 35 USC §120 of U.S. provisional patent application Ser. No. 60/697,980 filed Jul. 12, 2005 by Michel Authier and presently pending. The contents of the above-mentioned patent application are incorporated herein by reference.

FIELD OF THE INVENTION

The present invention relates to the field of bathing unit systems, such as spas, whirlpools and hot tubs. More particularly, the present invention relates to bathing unit systems that are operative to heat the water used therewith via power generated from solar energy.

BACKGROUND

Control systems for bathing unit systems such as spas, whirlpools, hot tubs, bathtubs, therapeutic baths and swimming pools, are well known in the art. Typically, such control systems are operative for controlling the various functional components of the bathing unit systems. The functional components can include water pumps, heating modules, filter systems, air blowers, ozone generators, and lighting systems, among others.

In general, bathing unit control systems include a controller to which the various bathing unit components are connected. This controller is adapted to control the power supplied from a power source to each one of the various components. More specifically, in response to signals received from a user of the bathing unit system, for example via a control panel, and/or in response to signals received from various sensors, the controller will activate or de-activate the various bathing unit components by supplying power, or ceasing to supply power, to those components.

A function of the control system is to control the activation and de-activation of the heating module of the bathing unit system in order to maintain the temperature of the water within the water receptacle within a desired temperature range. In the case of most bathing unit systems the water temperature is maintained between 80 and 104 degrees Fahrenheit.

Unlike bathtubs, the water contained within the water receptacles of many bathing unit systems is not drained each time the bathing unit system is used. As such, it is desirable to maintain the water temperature within the desired temperature range at all times, even when the bathing unit system is not in use, such that the water does not have to be reheated every time a user wishes to use the bathing unit system. Bathing unit systems are known to consume a significant amount of energy to maintain the water at a given temperature. This is especially true for bathing unit systems that are located outdoors in cold climates. With energy consumption being a constant concern for governments and energy producers, it is possible that in the near future the energy consumption of bathing unit systems will be regulated in certain regions of the world. Furthermore, the cost associated with heating the bathing unit, which the consumer bears, can be significant.

In order to conserve energy, most bathing unit systems include a cover that fits over the water receptacle when the bathing unit system is not in use. These covers are generally insulated in order to prevent as much heat loss from the water as possible. However, even with the insulated covers, the controller is still required to provide power to the heating module in order to keep the water within the water receptacle within a desired temperature range.

One suggested manner of reducing the amount of energy consumption of a pool system is described in U.S. Pat. No. 4,322,297 issued to Bajka on Mar. 30, 1982. Bajka describes using the combination of solar water heating and non-solar water heating for improving the efficiency of the pool system. More specifically, Bajka describes a controller that is capable of preferentially using the solar water heating when possible. A deficiency with the system described by Bajka lies in the manner in which the solar heating occurs. More specifically, the solar heating consists of solar panels through which water can flow. As the water flows through the solar panels, it increases in temperature due to the energy from the sun. The deficiency with this is that the solar heating described in Bajka is not functional in cold climates. For example, in the wintertime, the water within the solar panels can freeze rendering the system inoperable.

In light of the above, it can be seen that there exists a need in the industry to provide a controller for a bathing system that alleviates at least in part the deficiencies associated with the prior art.

SUMMARY

In accordance with a broad aspect, the present invention provides a control system suitable for use with a bathing unit system having a water receptacle. The control system comprises a heating module, a power source and a controller in communication with the heating module and the power source. The heating module has a body that defines a passage through which water can flow. The power source is operative for supplying power generated from solar energy to the heating module. The power source includes an energy storage member adapted for establishing an electrical connection with a solar panel for storing energy collected from the solar panel. The controller is operative for causing the power source to supply power to the heating module at least in part on the basis of first information derived from a temperature of the water within the water receptacle and second information derived from a condition associated with the power source.

In accordance with another broad aspect, the invention provides a control system for a bathing unit system. The control system comprises a first power source, a second power source and a controller in communication with the first power source and the second power source. The second power source is suitable for supplying power derived from solar energy. The second power source includes an energy storage member for establishing an electrical connection with a solar panel for storing energy collected from the solar panel. The controller is operative for selecting one of the first power source and the second power source for supplying power to a heating module. The heating module includes a body defining a passage through which water can flow.

In accordance with yet another broad aspect, the invention provides a bathing unit system that comprises a water receptacle, a heating module having a body that defines a passage through which water can flow, a power source for supplying power generated from solar energy to the heating module and a controller that is in communication with the heating module and the power source. The power source includes an energy storage member adapted for establishing an electrical connection with a solar panel for storing energy collected from the solar panel. The controller is operative for causing the power source to supply power to the heating module at least in part on the basis of first information derived from a temperature of the water within the water receptacle and second information derived from a condition associated to the power source.

In accordance with yet another broad aspect, the present invention provides a control system suitable for use with a bathing unit system that has a water receptacle. The control system comprises heating means for heating water from the water receptacle, power source means for supplying power generated from solar energy to the heating means and controller means for causing the power source means to supply power to the heating means at least in part on the basis of first information derived from a temperature of water within at least one of the water receptacle and a heating module and second information derived from a condition associated to the power source means. The power source means include energy storage means for establishing an electrical connection with a solar panel for storing energy collected from the solar panel.

In accordance with yet another broad aspect, the present invention provides a control system suitable for use with a bathing unit system having a water receptacle. The control system comprises a heating module having a body defining a passage through which water can flow, a first power source, a second power source and a controller. The first power source is operative for supplying power to the heating module and the second power source is operative for supplying power generated from solar energy to the heating module. The second power source including an energy storage member for storing energy collected from the solar panel. The controller is in communication with the heating module, the first power source and the second power source, and is operative for deriving energy consumption information associated with the use of the second power source.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
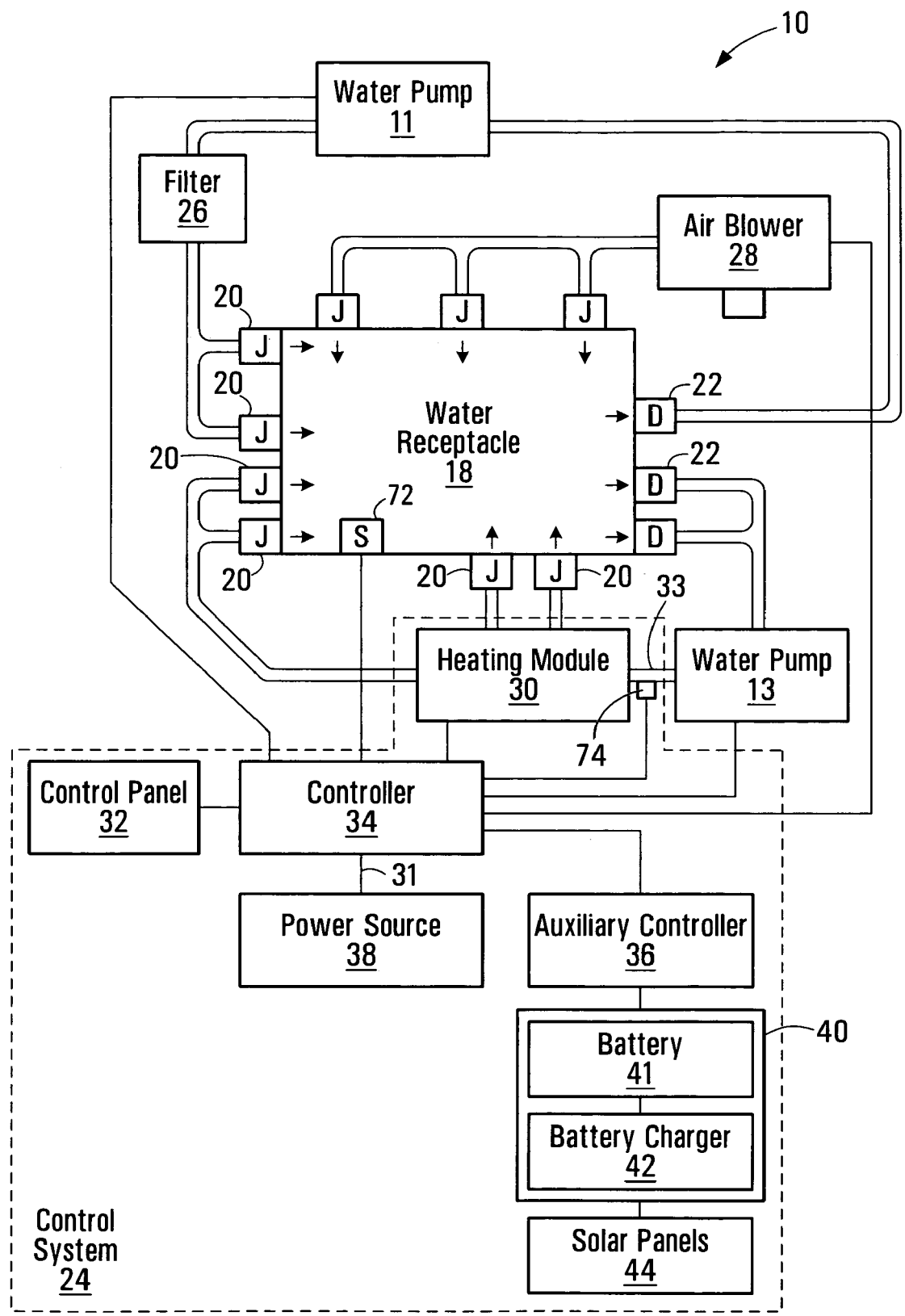
FIG. 1 shows a bathing unit system in accordance with a first non-limiting example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

Shown in FIG. 1 is a block diagram of a bathing unit system 10 in accordance with a non-limiting example of implementation of the present invention. The term "bathing unit system", as used for the purposes of the present description, refers to spas, whirlpools, hot tubs, bath tubs, therapeutic baths, swimming pools and any other type of bathing receptacle that can be equipped with a control system for controlling various operational settings.

The Bathing Unit System 10

The bathing unit system 10 shown in FIG. 1 includes a water receptacle 18 for holding water, a plurality of jets 20, a plurality of drains 22, a control system 24 and a plurality of bathing unit components. The bathing unit components shown in FIG. 1 include water pumps 11 and 13, a filter 26 and an air blower 28 for delivering air bubbles to the water receptacle 18. It should be understood that the bathing unit system 10 can include more or less bathing unit components without departing from the spirit of the invention. For example, the bathing unit system 10 could also include an ozonator, lighting components for lighting up the water in the water receptacle 18, multimedia components such as a CD/DVD player and/or any other components suitable for use in a bathing unit system 10.

During the course of normal operation, water flows from the water receptacle 18 through one or more drains 22 and is pumped by water pump 13 through the circulation piping 33 and the heating module 30 where the water is heated. The heated water re-enters the water receptacle 18 through one or more jets 20. This cycle of water leaving the water receptacle 18 through one or more drains 22, passing through the heating module 30 and re-entering the water receptacle 18 through one or more jets 20 is repeated continuously while the water pump 13 is active.

In addition, the water from the water receptacle 18 passes through a filtration cycle wherein the water flows through one or more drains 22 and is pumped by water pump 11 through a filter 26. After having been filtered, the water then re-enters the water receptacle 18 through one or more jets 20. This cycle of water leaving the water receptacle 18 through drains 22, passing through the filter 26 and re-entering the water receptacle 18 through jets 20 is repeated continuously while the water pump 11 is active. This cycle keeps the water clean from particulate impurities.

The Control System 24

As mentioned above, the bathing unit system 10 includes a control system 24 for controlling the temperature of the water within the water receptacle 18 and activating and deactivating the various bathing unit components of the bathing unit system 10. In the non-limiting embodiment shown in FIG. 1, the control system 24 includes a heating module 30, a control panel 32, a controller 34, an auxiliary controller 36 (optional), a first power source 38 and a second power source 40.

Heating Module 30

In accordance with a non-limiting example of implementation, the heating module 30 includes a body defining a passage through which water can flow as well as a heating element for transferring heat to the water that flows through the passage. The heating element can include an electric heater or a gas heater without departing from the spirit of the invention. Alternatively, the heating element can include heating surface components positioned on the outer and/or inner surfaces of the body of the heating module. It is to be understood that the water flow passage and heating element can take various respective configurations without departing from the spirit and scope of the present invention. As will be described in more detail below, regardless of the type of heating element employed by the heating module 30, the heating module 30 is operative for being powered by one of the first power source 38 and the second power source 40.

The body of the heating module 30 can be formed of a conductive material or an electrically non-conductive material. The expression "electrically non-conductive material" refers to a class of materials having substantially low electrical conductivity properties such as plastics, elastomers, ceramics, and selected composite materials. Moreover, the body of the heating module 30 may include a plurality of electrically non-conductive portions, or may be made entirely of such electrically non-conductive materials. In a specific practical implementation, the body of the heating module 30 is formed of an electrically non-conductive portion, but comprises one or more conductive portions for providing an electrical path between the water in the heating module 30 and ground.

Control Panel 32

The control panel 32 is typically in the form of a user interface that allows a user to enter command signals for controlling the various operational settings of the bathing unit system 10. The control panel 32 can include buttons, levers or any other device known in the art for enabling a user to enter input commands for controlling the various operational settings of the bathing unit system 10. The user can also use the control panel 32 for entering input commands indicative of which of the first and second power source 38 and 40 should be used to power the heating module 30.

In a non-limiting embodiment, the control panel 32 can include a screen for conveying information to a user, such as the water temperature, the ambient air temperature and the time, among other possibilities.

Some non-limiting examples of the operational settings of the bathing unit system 10 that can be controlled by the control panel 32 include on/off settings, temperature control settings, jet control settings, lighting settings, etc. In a non-limiting example of implementation, the bathing unit system 10 includes entertainment and/or multimedia components, such that the operational settings of the bathing unit may also include audio settings and video settings, amongst others. Consequently, the expression "operational settings", for the purpose of the present invention, is intended to cover operational settings for any suitable component that is part of the bathing unit system 10.

First Power Source 38

In accordance with the present invention, the first power source 38 is a "traditional" power source such as a standard electric power source or a gas powered source. For the purposes of the present invention, the term "traditional" power source refers to power sources that supply power generated from commercial energy providers and for which the user must pay a fee typically based on consumption. The first power source 38 is operative to supply the controller 34 with any conventional power service suitable for residential or commercial use. For example, the first power source 38 can supply 240 volts (V) AC to the controller 34 via service wiring 31. In an alternative non-limiting example of implementation, the power source 38 can supply 120 V AC to the controller 34 via service wiring 31. In a further alternative non-limiting example of implementation, the power source 38 can supply 120 V and 240 V AC to the controller 34 via service wiring 31. It is to be appreciated that other voltage supply values or voltage supply combinations are possible without detracting from the spirit and scope of the invention. For example the voltage supply values may be different depending on geographical location.

Second Power Source 40

Specific to the present invention, the second power source 40 is operative for supplying power generated from solar energy. The second power source 40 includes one or more energy storage members for storing energy collected from solar energy. In the non-limiting example of implementation shown, the one or more energy storage members are in the form of batteries 41. The batteries 41 are adapted for establishing an electrical connection with one or more solar panels 44 such that they are able to store the energy collected from the solar panels 44. A battery charger 42 is connected between the batteries 41 and the solar panels 44 and is operative for converting the electrical energy from the solar panels 44 into an electric current to charge the batteries 41. Since power from the batteries 41 may not be needed at all times, the current used to charge the batteries is passed through a regulation circuit so as to regulate the current stored within the batteries 41. In a non-limiting example of implementation, the regulation circuit is included within the battery charger 42. However, it should be understood that the regulation circuit could be separate from the battery charger 42 and could have been represented by an additional block within FIG. 1.

In a non-limiting example of implementation, solar panels including a photovoltaic module supplied by Evergreen Solar, GmbH are suitable for use with the bathing unit system 10. It will be appreciated that once the initial cost of purchasing the solar panels has been made, the solar panels will generate energy essentially free of charge. As such, by powering the heating module 30 of the bathing unit system 10 via energy generated from the solar panels 44, the operating costs of the bathing unit system 10 can be greatly reduced.

Controller 34

The controller 34 is operative for controlling the activation/de-activation of the various bathing unit components and of the heating module 30. This can be done on the basis of commands entered by the user via the control panel 32, or on the basis of control signals received from various sensors.

In the non-limiting embodiment shown, the controller 34 is in communication a temperature sensor 72 that is operative for taking a temperature measurement of the water within the water receptacle 18. In addition, the controller 34 is in communication with a temperature sensor 74 that is operative for taking a temperature measurement of the water within the circulation piping 33 of the heating module 30. Although not shown, the bathing unit system 10 can also include other sensors that are operative for monitoring various operational conditions of the bathing unit system 10. For example, the bathing unit system 10 may include liquid level sensors for monitoring the water level at various locations in the bathing unit system 10. Other sensors that are suitable for use within a bathing unit system 10 can also be included without departing from the spirit of the invention.

As will be described in more detail below, the controller 34 is operative for selecting between the first power source 38 and the second power source 40 for supplying power to the heating module 30. It will be appreciated that the use of the second power source 40, namely the solar charged batteries 41 in this non-limiting example, will reduce the amount of energy required from the first power source 38, and thereby reduce the energy costs associated with operating the bathing unit system 10. The manner in which the controller 34 selects between the first power source 38 and the second power source 40 will be described in more detail further on in the specification.

Auxiliary Controller 36

In the non-limiting embodiment shown in FIG. 1, the control system 24 further includes an auxiliary controller 36. The auxiliary controller 36 is in communication with both the controller 34 and the second power source 40, such that it is operative for causing the second power source 40 to supply power to the heating module 30 on the basis of commands received from the controller 34. Although the auxiliary controller is represented by block 36 in FIG. 1, it should be appreciated that, in certain embodiments, the functionality of the auxiliary controller 36 can be included within the controller 34.

Supplying Power to the Heating Module 30

For most bathing unit systems 10, the temperature of the water contained within the water receptacle 18 is maintained within a desired temperature range at all times, including those times when the bathing unit system 10 is not in use. In this manner the water contained within water receptacle 18 does not need to be re-heated every time a bather wishes to use the bathing unit system 10. A common temperature range for the water within water receptacles 18 of most bathing unit systems 10 is somewhere between 80 and 104 degrees Fahrenheit. Since this temperature range is quite high, it will be appreciated that if the water temperature was not kept within proximity to this desired temperature range at all times, it would take a long time to reheat the water every time a user wanted to use the bathing unit system 10.

Figure 2:
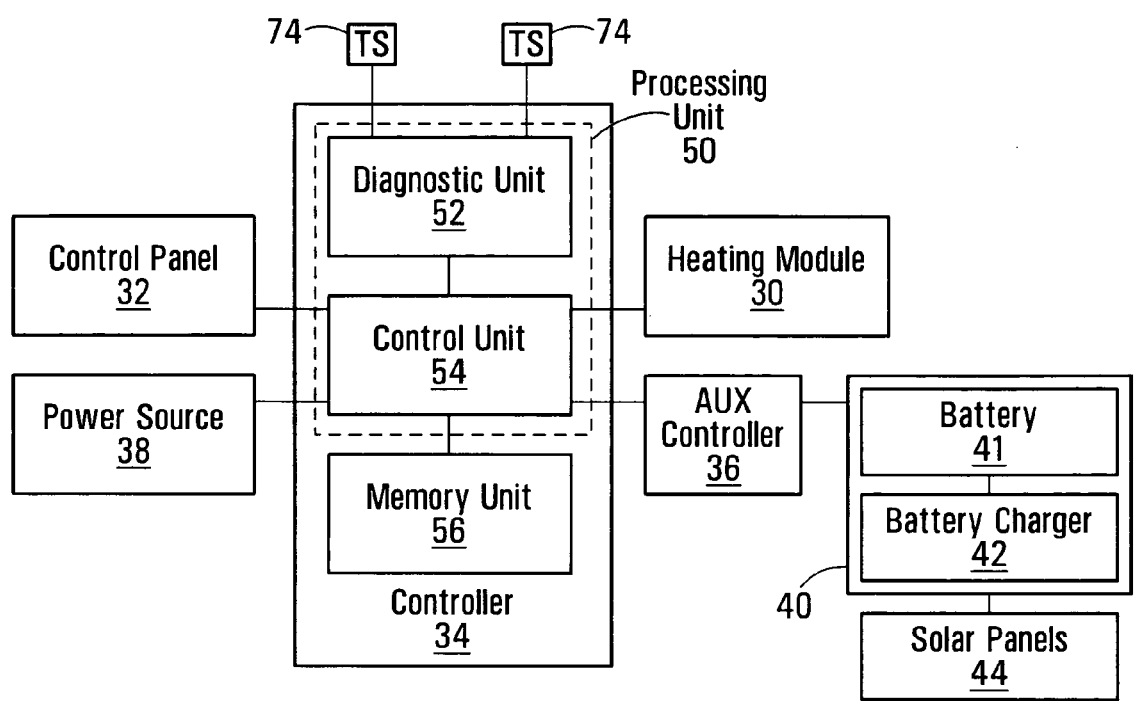
FIG. 2 shows a block diagram of a controller in accordance with a non-limiting example of implementation of the present invention.

As mentioned above, controller 34 monitors the conditions of the water and maintains the water temperature in the water receptacle 18 within the desired temperature range. Shown in FIG. 2 is a more detailed diagram of a controller 34 in accordance with a non-limiting embodiment of the present invention. In the embodiment shown, the controller 34 includes a processing unit 50 and a memory unit 56. The processing unit 50 includes a diagnostic unit 52 and a control unit 54.

The desired temperature range of the water within the water receptacle 18 is generally calculated on the basis of a desired water temperature. Typically, the desired temperature range is calculated to be within a few degrees of the desired water temperature. For example, the desired temperature range may be ±1° C. from the desired water temperature. The desired water temperature can be a predefined temperature stored in memory 56, or a temperature that is entered by a bather via the control panel 32. In the case where the desired water temperature is entered by a bather, it is also stored in the memory unit 56. Preferably, the desired water temperature is between 38 and 41° C. For the sake of example, let us assume that a bather entered the desired temperature of 40° C. As such, the desired temperature range might be from 39° C. to 41° C.

It should be understood that the controller 34 may be operative to maintain the water within the water receptacle 18 within different desired temperature ranges depending on different conditions. For example, there may be a first desired temperature range when the bathing unit system is in use and a second desired temperature range when the bathing unit system is not in use. In such a case, the second desired temperature range may be lower than the first desired temperature range. For example, the desired temperature range when the bathing unit system is in use may be between 39-41° C., and the desired temperature range when the bathing unit system is not in use may be between 37-39° C. In this manner, when the bathing unit system 10 is not in use, the water within the water receptacle 18 will remain warm enough so that it can be quickly heated to the desired "in use" temperature, but will not require as much energy as if the water were kept within the higher temperature range at all times.

It should be appreciated that different temperature ranges may also be used in other circumstances as well. For example, there may be a certain desired temperature range for summer use, and a different desired temperature range for winter use. Likewise, there may be a certain desired temperature range for day time use, and a different desired temperature range for night time use. Furthermore, the ambient air temperature may determine the desired temperature range so that the range is set differently on a very hot day than on a cooler day. These temperature ranges may be preset by the controller 34 manufacturer or may be programmable by a user of the bathing unit system.

These different temperature ranges, as well as program instructions for instructing the control unit 54 when to use these different temperature ranges, may be stored in the memory 56 of the controller 34.

A non-limiting example of a process used by the controller 34 for maintaining the water temperature within the water receptacle 18 within a desired temperature range will now be described in more detail.

For the sake of simplicity, let us assume that the process begins when the heating module 30 is in the de-activated state. It should be appreciated, however, that the process that is about to be described is performed on a cyclical basis, and as such there is no specific starting point.

While the heating module 30 is in the deactivated state, the controller 34 is operative for monitoring the temperature of the water within the water receptacle 18. This can be done by obtaining readings from the temperature sensor 72 located within the water receptacle 18, or in the case where there is no temperature sensor within the water receptacle 18, this can be done by obtaining readings from a temperature sensor 74 located within the circulation piping 33 of the heating module 30. Preferably, in the case where the temperature reading is taken from the temperature sensor 74, the controller 34 causes the water pump 13 to circulate water from the water receptacle 18 through the circulation piping 33 prior to taking a temperature reading. This ensures that the reading of the temperature sensor 74 is in fact indicative of the temperature of the water within the water receptacle 18. More specifically, once the water pump 13 has been de-active for a period of time, the water in the circulation piping 33 will often be at a different temperature than the water in the water receptacle 18. This difference in temperature may be caused by the water receptacle 18 being positioned in direct sunlight and the circulation piping 33 being positioned under the water receptacle 18 in the shade. Therefore, in order to ensure that the reading taken by temperature 74 is in fact indicative of the temperature of the water within the water receptacle 18, the water is circulated between the water receptacle 18 and the heating module 30 for a period of time prior to taking a temperature reading. A method of controlling the activation/deactivation of the water pump 13 is described in co-pending U.S. patent application 10/768,062, filed on Feb. 2, 2004 in the name of Christian Brochu et al. the contents of which are incorporated herein by reference.

It should be appreciated that although temperature sensor 74 is shown as being located within the circulation piping 33, the temperature sensor 74 could also be positioned in other locations, such as within the body of the heating module 30, without detracting from the spirit of the invention.

It should also be appreciated that although FIG. 1 shows a bathing unit system 10 that includes both temperature sensors 72 and 74, it is within the scope of the present invention for the bathing unit system 10 to include only one of temperature sensors 72 and 74.

With reference to FIG. 2, the diagnostic unit 52 of the controller 34 obtains the temperature readings from one or both of sensors 72 and 74. These temperature readings are taken periodically and are processed at least in part on the basis of the desired temperature range stored in memory 56 in order to determine when the water temperature within the water receptacle 18 has approached, or descended below, the lower limit of the desired temperature range. Once the temperature has approached or descended below the lower limit of the temperature range, the diagnostic unit 52 sends a message to the control unit 54, such that the control unit 54 can causes the heating module 30 to be activated. The heating module 30 is activated when it is supplied power from one of the first power source 38 and the second power source 40. The manner in which the control unit 54 selects between the first power source 38 and the second power source 40 will be described in more detail later on in the description.

Once the heating module 30 is activated, the water within the water receptacle 18 begins to heat up. During this time, the diagnostic unit 52 of the controller 34 continues to obtain temperature readings from one or both of the temperature sensors 72 and 74. Again, these temperature readings are processed at least in part on the basis of the desired temperature range stored in memory 56. When the diagnostic unit 52 determines that the water temperature has reached or exceeded the upper level of the desired temperature range, the diagnostic unit 52 sends a message to the control unit 54 for causing the heating module 30 to be deactivated. While the heating module is deactivated, the water in the water receptacle 18 begins to cool down. Then, as described above, the diagnostic unit 52 obtains temperature readings from one or both of temperature sensors 72 and 74 for determining when the temperature has reached the lower limit of the temperature range. Then the cycle begins again. This process is repeated continuously in order to keep the water temperature within the water receptacle 18 within the desired temperature range.

Although not shown in FIG. 2, the controller 34 is in communication with actuators for causing the water pump 13 and the heating module 30 to be activated and deactivated. Some non-limiting examples of actuators that can be used for this purpose include relays, switches and TRIACs.

Selecting between the First Power Source and the Second Power Source

The manner in which the controller 34 selects between the first power source 38 and the second power source 40 will now be described in more detail with reference to the flow chart shown in FIG. 3.

Firstly, at step 100, the controller 34 determines whether the water within the water receptacle 18 needs to be heated, and as such whether the heating module 30 needs to be activated. This is determined using the process described above, wherein the heating module 30 is activated when the water temperature within the heating module 30 has approached, or descended below, the lower limit of the desired temperature range. Until the lower limit of the temperature range has been approached no action is taken.

Once the temperature of the water within the water receptacle 18 has approached or descended below the lower limit of the temperature range, the control unit 54 of the controller 34 determines that the water needs to be heated and that the heating module 30 should be activated. In order to cause the heating module 30 to be activated, the controller 34 must allow power to be supplied to the heating module 30. As such, at step 102, the control unit 54 selects one of the first power source 38 and the second power source 40 to supply power to the heating module 30. This selection can be made on the basis of program instructions stored in the memory unit 56, or on the basis of a command entered by a user of the bathing unit system.

For example, a user may enter a command via the control panel 32 indicative that only the first power source 38 is to be used until further notice. In such a case, at step 102 the control unit 54 will select the first power source 38. It should be understood that the user could also enter a signal via the control panel 32 indicative that only the second power source 40 is to be used. In such as case, at step 102, the control unit 54 will select the second power source 38.

Alternatively, the control unit 54 can select one of the first power source 38 and the second power source 40 on the basis of program instructions stored within the memory unit 56 of the controller 34. The program instructions can cause the control unit 54 to select one of the first power source 38 and the second power source 40 on the basis of many different some pre-programmed criteria.

In accordance with a first non-limiting example, the program instructions may cause the control unit 54 to select the second power source 40 at all times. As such, whenever the control unit 54 determines that the heating module 30 should be activated, the control unit 54 will select the second power source 40.

In accordance with a second non-limiting example, the program instructions may cause the control unit 54 to intermittently select between the first power source 38 and the second power source 40 on the basis of time. More specifically, the program instructions may cause the control unit 54 to select the first power source 38 for a first length of time, and then select the second power source for a second length of time. For example, it may be desirable to use the first power source 38 for two hours, and then use the second power source 40 for two hours. The control unit 54 may switch back and forth between the two power sources in this manner. Alternatively, the program instructions may cause the control unit 54 to alternate between the two power sources each time a power source needs to be used. As such, the first power source 38 will be selected the first time power needs to be supplied to the heating module 30, and then the second power source 40 will be selected for second time power needs to be supplied to the heating module. The control unit 54 may switch back and forth in this manner. In yet another alternative example, the program instructions may cause the control unit 54 to select between the two power sources in a random-like manner.

In yet another alternative example, the program instructions may instruct the control unit 54 to select between the two power sources on the basis of the functioning of the bathing unit system 10. For example, the program instructions may cause the control unit 54 to select the first power source 38 when the bathing unit system 10 is being used by a bather, and the second power source 40 when the bathing unit system 10 is not in use. In this manner, the second power source would be used as much as possible when the bathing unit system is not in use. There are many ways that the control unit 54 can detect that the bathing unit system 10 is in use. For example, the control unit 54 can detect that the system is in use when a user activates a "start" button on the control panel 32. Alternatively, the bathing unit system may include a sensor that detects when the bathing unit cover is off. As such, when the control unit 54 detects that the cover is off, the bathing unit system detects that the system is in use. Many other manners of detecting that the bathing unit system 10 is in use are included within the scope of the present application.

It should be appreciate that the program instructions can cause the control unit 54 to select between the first power source 38 and the second power source 40 on the basis of a variety of different criteria, not all of which have been described above. The present invention is not limited to the manner in which the control unit 54 selects between the first and second power sources.

Referring back to FIG. 3, in the case where the control unit 54 selects the first power source 38, the process proceeds to step 104, wherein the control unit 54 causes the first power source 38 to supply power to the heating module 30.

However, in the case where the control unit 54 selects the second power source 40, the process proceeds to step 106, wherein the controller 34 determines whether the second power source 40 can in fact be used to supply power to the heating module 30. Under certain conditions which will be described below, it is not always possible for the second power source 40 to supply power to the heating module 30.

In accordance with the present invention, the controller 34 is operative for causing the second power source 40 to supply power to the heating module 30 on the basis of first information derived from a temperature of the water within the water receptacle 18 and on the basis of second information derived from a condition associated with the second power source 40. In accordance with a non-limiting example of implementation, the first information includes temperature measurements obtained from one or both of the temperature sensors 72 and 74. This information is received at the diagnostic unit 52.

In a first non-limiting example of implementation, the diagnostic unit 52 processes this first information against the desired temperature range in order to confirm that the water temperature in the water receptacle 18 has approached or descended below the lower limit of the desired temperature range. In the case where it has approached or descended below the desired temperature range, the diagnostic unit 52 confirms that it is appropriate to supply power from the second power source 40. It should be appreciated that this processing operation may in fact have taken place at step 100, and as such is not repeated again at this stage.

In an alternative non-limiting example of implementation, the diagnostic unit 52 processes the first information at least in part on the basis of minimum temperature information stored in the memory unit 56. The minimum temperature information is operative for enabling the diagnostic unit 54 to determine whether the water temperature is too low to be heated via power supplied by the second power source 40. If the water temperature is too low, the second power source 40 may not be sufficient for supplying enough power to raise the temperature of the water, or to raise the temperature of the water fast enough. In such a situation, the diagnostic unit 52 may determine that it is not appropriate to use the second power source 40. However, if the water temperature is above the minimum temperature information, the diagnostic unit 52 will determine that the second power source 40 can be used.

The second information is also received at the diagnostic unit 52 through the auxiliary controller 36. It should be appreciated that in the case where there is no auxiliary controller 36, the diagnostic unit 52 obtains the second information directly from the battery or batteries 41. In accordance with a non-limiting example of implementation, the second information is indicative of the voltage of the battery or batteries 41.

The diagnostic unit 52 is operative to process this information to determine whether the battery or batteries 41 have sufficient voltage to power the heating module 30. It should be appreciated that, instead of receiving a signal indicative of the voltage of the battery or batteries 41, the auxiliary controller 36 may simply issue a signal to the diagnostic unit 52 indicative that there is, or is not, sufficient voltage in the batteries 41 for heating the water. At least in part on the basis of this second information, the diagnostic unit 52 is able to determine whether or not the second power source 40 can be used to supply power to the heating module 30.

Therefore, the diagnostic unit 52 is operative for processing this first information and the second information in order to determine if the secondary power source 40 can be used to supply power to the heating module 30.

In a first non-limiting example of implementation, in the case where the first information and the second information are indicative that it is inappropriate to use the second power source 40, the control unit 54 proceeds to step 108 and defaults to causing the first power source 38 to supply power to the heating module 30.

Alternatively, in the case where the first information and the second information are indicative that it is inappropriate to use the second power source 40, instead of defaulting to the first power source 38, the control unit 54 will do nothing, meaning that neither power source will provide power to the heating module 30. This may be the case if a user has entered a command indicative that only the second power source 40 is to supply power to the heating module 30 under all conditions. As such, if the second power source 40 is unable to provide power to the heating module 30, there will be no power supplied to the heating module 30.

In the case where both the first information and the second information are indicative that the second power source 40 can be used, the diagnostic unit 52 issues a command to the control unit 54 indicative that the second power source 40 should be used. As such, at step 110, the control unit 54 either directly, or indirectly via the auxiliary controller 36, causes the second power source 40 to supply power to the heating module 30.

In a non-limiting implementation, when the control unit 54 proceeds to step 110, the diagnostic unit 52 continues to obtain information from one or both of temperature sensors 72 and 74 associated with the temperature of the water in the water receptacle 18. If the water temperature within the water receptacle 18 decreases, or stays the same while the secondary power source 40 is supplying power to the heating module 40, the diagnostic unit 52 returns to step 106 and determines that the second power source 40 is insufficient to do the job. In such cases, the controller 34 will proceed to step 108 wherein the control unit 54 defaults to causing the first power supply 38 to supply power to the heating module 30.

As mentioned above, the manner in which the controller 34 selects to use the second power source 40 can depend on a variety of different criteria. However, once the controller 34 has determined that the second power source 40 should be used, the controller 34 then determines on the basis of the first information and the second information described above whether the second power source 40 can in fact be used. When the first and second information are indicative that the second power source 40 cannot or should not be used, the controller 34 will either automatically default to using the first power source 38 to supply power to the heating module 30, or will prevent any power from being supplied to the heating module 30.

Figure 3:
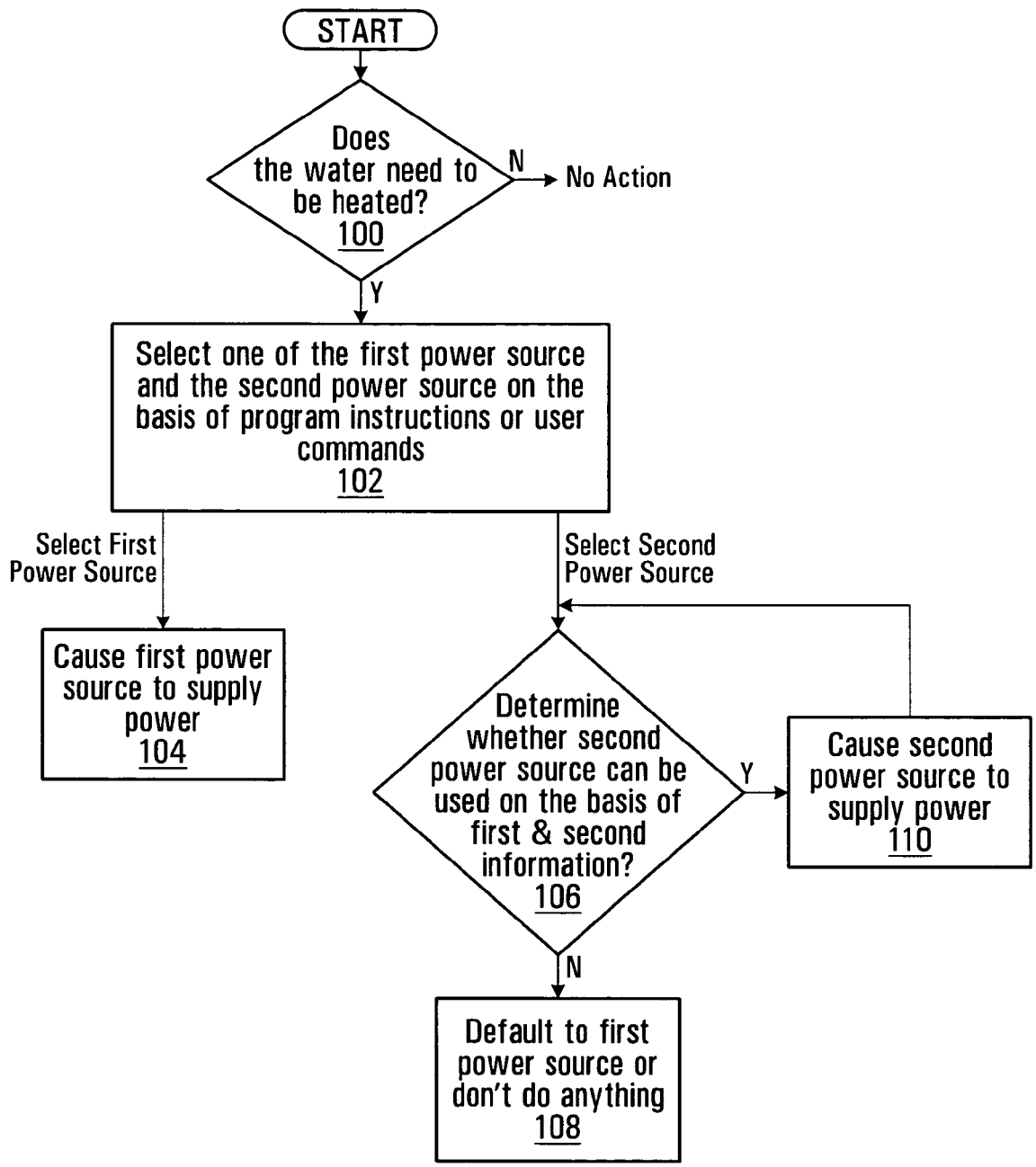
FIG. 3 is a flow chart of a process for selecting a power source for supplying power to a heater module in the bathing unit system in accordance with a non-limiting example of implementation of the present invention.

Although the flowchart of FIG. 3 shows step 106 as being after step 102, it should be appreciated that these two steps can be performed simultaneously, instead of one after the other. As such, the determination of whether the second power source 40 can be used occurs at the same time as the control unit 54 is performing the selection of the first and second power sources 38, 40.

Alternatively, step 106 can be performed prior to step 102, such that the control unit 54 knows whether the second power source 40 can be used prior to selecting between the first and second power sources 38, 40. In such a case, the determination of whether the second power source 40 can be used will affect the selection between the first and second power source 38, 40. For example, in the case where the control unit 54 determines that the second power source 40 cannot be used, then at step 102 the control unit 54 will select the first power source 38 (provided that the user has not indicated that only the second power source 40 can be used).

Optionally, in the case where the second power source 40 is being used to supply power to the heating module 40, the second power source 40 may also supply power to the water pump 13 and, optionally, the other bathing unit components.

In accordance with a non-limiting example of implementation, in order to be able to supply power to the heating module 30 via a selected one of the first power source 38 and the second power source 40, the controller 34 is in communication with a first actuator associated with the first power source 38 and a second actuator associated with the second power source 40. Thus, depending on which power source is selected by the controller 34, the controller 34 causes the actuator associated with the selected power source to be activated, such that power from that power source can pass to the heating module 30.

In yet another embodiment, both the first power source 38 and the second power source 40 can be used simultaneously to supply power to the heating module 30. This may be desirable in the case where the second power source 40 is not able to supply sufficient power to the heating module 30 on its own, but it is not desirable to default to the first power source 38 altogether. As such, the second power source 40 can supply what power it is able to, and the first power source 38 can supply the remaining power required. In this way the costs of operating the bathing unit system are less than if the control unit 54 simply defaults to using the first power source 38.

In the embodiment described above with respect to FIG. 1, the control system 24 includes only a single heating module 30. Although only one heating module 30 is shown, it should appreciated that more than one heating module can be included within the scope of the present invention.

Some non-limiting examples of alternative embodiments of the control system 24 will now be described in more detail with respect to FIGS. 4 and 5.

Bathing Unit System 60

Figure 4:
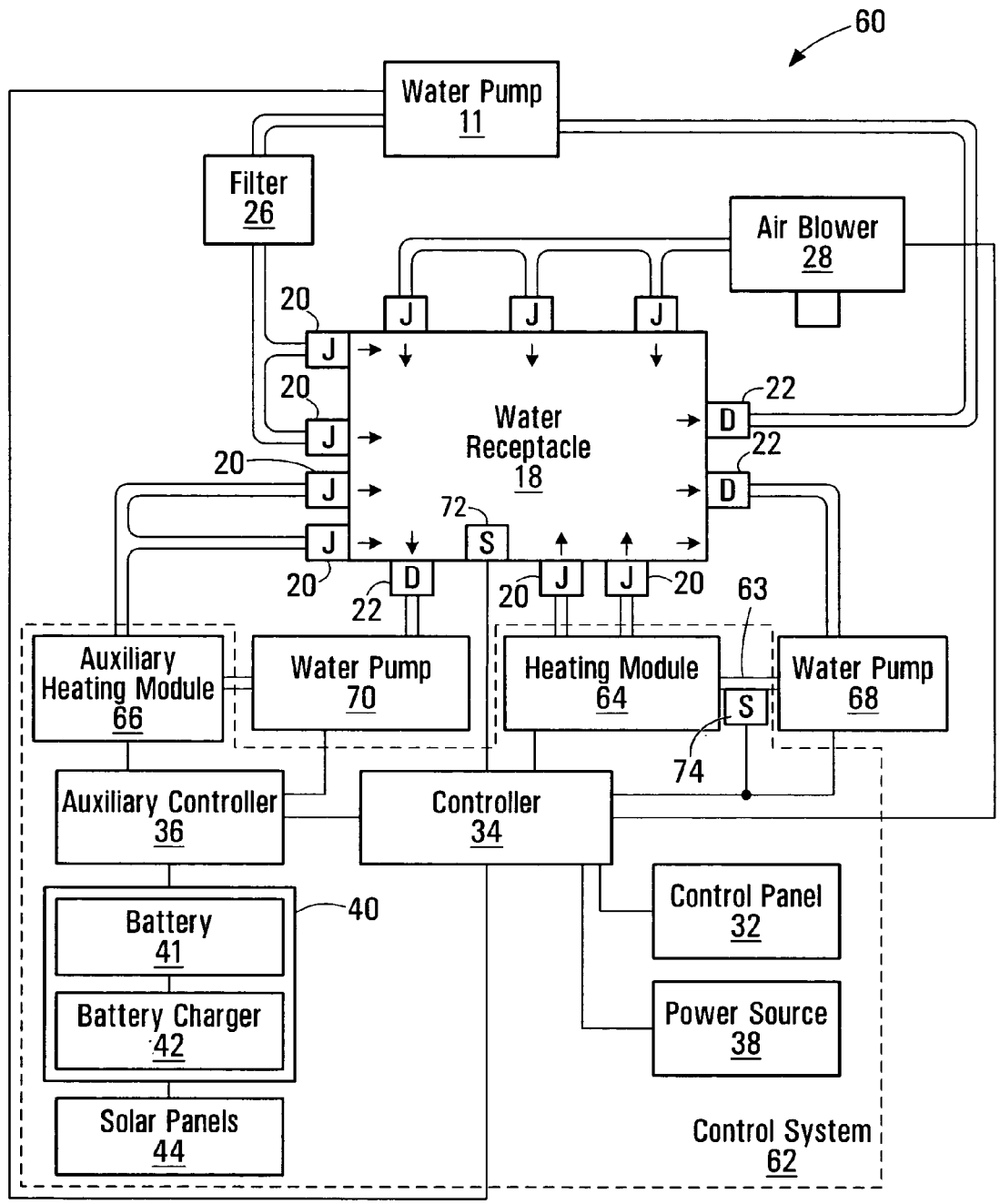
FIG. 4 shows a bathing unit system in accordance with a second non-limiting example of implementation of the present invention.

Shown in FIG. 4 is a bathing unit system 60 in accordance with a second a non-limiting example of implementation of the present invention. The components of the bathing unit system 60 that are the same as those described above with respect to bathing unit system 10 have been represented using the same reference numbers.

Bathing unit system 60 comprises a control system 62 that includes a controller 34, a control panel 32, an auxiliary controller 36 (optional), a first power source 38 and a second power source 40. However, as opposed to the control system 34 described above, the control system 62 shown in FIG. 4 includes a primary heating module 64 and an auxiliary heating module 66. The primary heating module 64 comprises separate circulation piping 63 from the circulation piping 65 associated with auxiliary heating module 66. As such, the primary heating module 64 is connected to a water pump 68 for causing water to flow through heating module 64. Likewise, the auxiliary heating module 66 is connected to a water pump 70 for causing water to flow through the heating module 66.

In accordance with this embodiment, the first power source 38 is associated with the primary heating module 64. As such, the second power source is associated with the auxiliary heating module 66. The controller 34 is in communication with each of the first power source 38 and the second power source 40 and is operative for causing the first heating module 64 and the auxiliary heating module 66 to be activated.

The manner in which the controller 34 maintains the water temperature within the water receptacle 18 is the same as that described above. More specifically, the controller 34 is in communication with one or both of temperature sensors 72 and 74 for obtaining the temperature of the water within the water receptacle 18. As such, when the water temperature approaches or descends below a desired temperature range, the controller causes one of the heating modules 64 or 66 to be activated.

Likewise, the manner in which the controller 34 selects which power source to be used, and determines whether the second power source can be used, are the same as those described above with respect to FIG. 3. A difference between the bathing unit system 10 described above with respect to FIG. 1, and the bathing unit system 60 shown in FIG. 4, is that when the controller 34 determines that power is to be supplied by the first power source 38, it is the primary heating module 64 and the water pump 68 that are activated. Similarly, when the controller 34 determines that power is to be supplied by the second power source 40, it is the auxiliary heating module 66 and the water pump 70 that are activated.

In a non-limiting example of implementation, the auxiliary heating module 66 may be designed to require less power than the heating module 64, such that it is easier for the second power source 40 to power. For example, the auxiliary heating module 66 may include a heating element (not shown) that emits less heat than a heating element of the primary heating module 64, but that does not require as much power from a power source in order to be activated. This set-up may be desirable when the second power source 40 is unable to supply sufficient power for activating the heating element of the primary heating module 64.

Bathing Unit System 80

Figure 5:
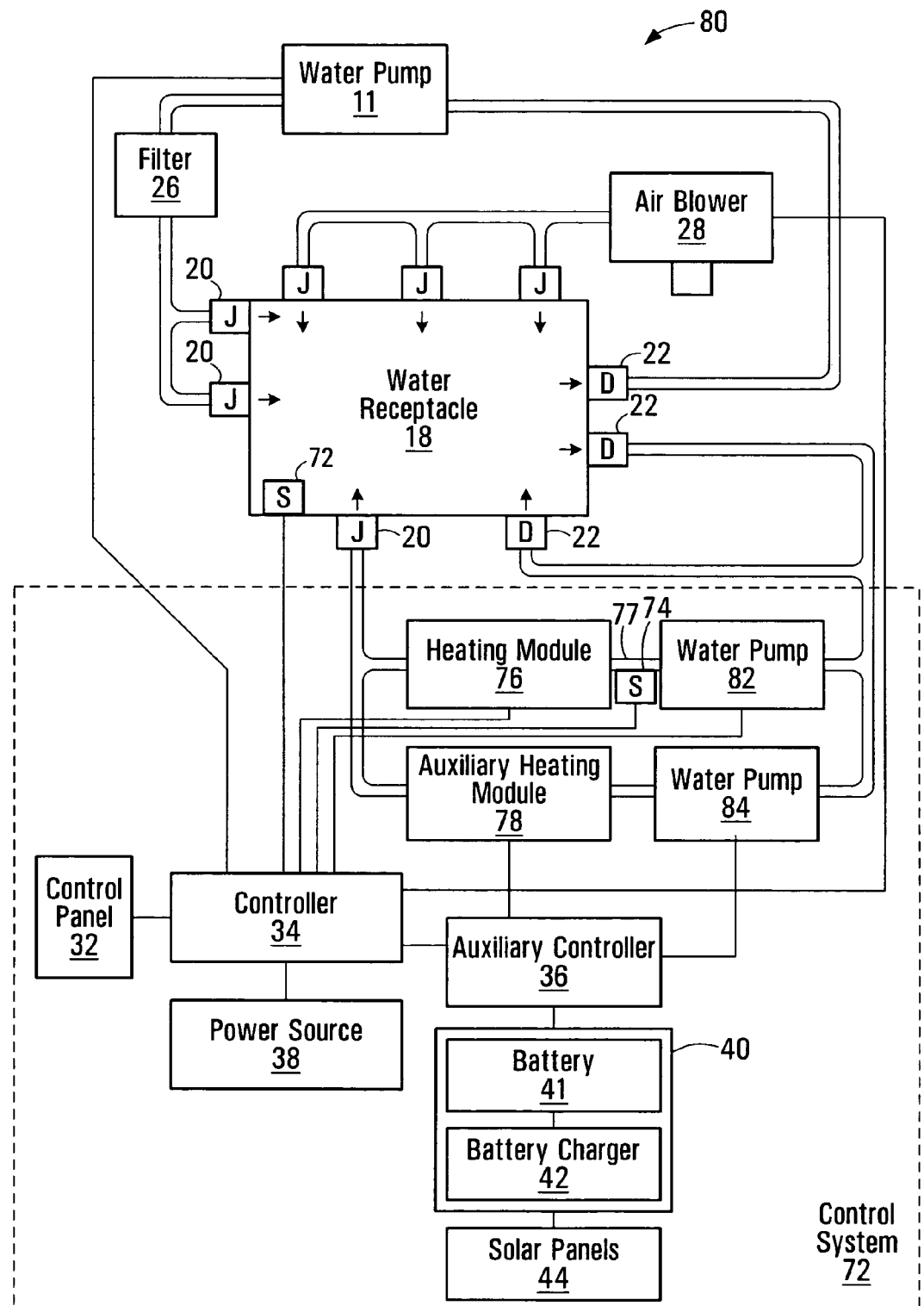
FIG. 5 shows a bathing unit system in accordance with a third non-limiting example of implementation of the present invention.

Shown in FIG. 5 is a bathing unit system 80 in accordance with a third non-limiting example of implementation of the present invention. The components of the bathing unit system 80 that are the same as those described above with respect to bathing unit system 10 shown in FIG. 1 have been represented using the same reference numbers.

Bathing unit system 80 comprises a control system 72 that includes a controller 34, a control panel 32, an auxiliary controller 36 (optional), a first power source 38 and a second power source 40. In the example depicted the second power source 40 includes one or more solar powered batteries. The control system 72 shown in FIG. 5 includes a primary heating module 76 and an auxiliary heating module 78. The primary heating module 76 and the auxiliary heating module 78 share the same circulation piping 77, but each include separate water pumps. The primary heating module 76 is connected to a water pump 82 for causing water to flow through heating module 76, and the auxiliary heating module 78 is connected to a water pump 84 for causing water to flow through the heating module 78. It should be appreciated that in an alternative embodiment, there may be a single water pump for circulating water through both the heating module 76 and the auxiliary heating module 78 at the same time.

The manner in which the controller 34 maintains the water temperature within the water receptacle 18 is the same as described above. More specifically, the controller 34 is in communication with one or both of temperature sensors 72 and 74 for obtaining the temperature of the water within the water receptacle 18. As such, when the water temperature approaches or descends below a desired temperature range, the controller 34 causes one of the heating modules 76 or 78 to be activated.

Likewise, the manner in which the controller 34 selects which power source to be used, and determines whether the second power source 40 can be used, are the same as those described above with respect to FIG. 3. A difference between the bathing unit system 10 described above, and the bathing unit system 80 shown in FIG. 5, is that when the controller 34 determines that power is to be supplied by the first power source 38, it is the primary heating module 76 and the water pump 82 that are activated. Similarly, when the controller 34 determines that power is to be supplied by the second power source 40, it is the auxiliary heating module 78 and the water pump 84 that are activated. Although the heating module 76 and the auxiliary heating module 78 have been shown as being connected in a parallel type configuration in FIG. 5, the heating module 76 and the auxiliary heating module 78 may also be connected in series in alternative implementations without detracting from the spirit of the invention.

Monitoring the Use of the Second Power Source

In a non-limiting example of implementation, the control unit 54 of the controller 34 is operative for deriving energy consumption information conveying information associated with the use of the second power source 40.

The energy consumption information derived by the control unit 54 can include information about the amount of time the second power source 40 is in use, the amount of time the second power source is in use compared with the first power source 38, the cost savings associated with the use of the second power source, and any other statistics associated with the use of the second power source 40. The information derived by the control unit 54 can, for example, be expressed in hours, percentages and/or dollars. As such, this information can convey to the user that the second power source is working properly, and, optionally, that it is reducing the costs associated with operating the bathing unit system 10. Optionally still, this information can be used to monitor the amount of power being consumed such as to automatically adjust the usage of the power sources depending on certain desired criteria.

Some non-limiting examples of information that could be conveyed to the user will be described below. In a first non-limiting example, the output conveyed to the user may include the amount of time the second power source was in use over the course of a week in comparison to the first power source. For example, the output may state:

Power Breakdown For The Past 7 Days
   Electric Power: 24 hrs
   Solar Power: 60 hrs Alternatively, this information can be given in percentages, such as:

Breakdown of Power Consumption For the Past 7 Days:
   Electric Power 30%
   Solar Power 70%

In a second non-limiting example, the information conveyed to the user may be the cost savings associated with the use of the second power source. For example, if it is known that the heating module requires 5.5 KW*hr of energy, and it is known that the second power source was in use for 60 hours over the course of a week, then it can be calculated that the second power source supplied 330 KW·hrs of power over the course of that week. This is essentially 330 KW·hr that would otherwise have had to be supplied by the first power source. Let us assume that the cost of a KW·hr of power supplied by the first power source is 10 cents. As such, the cost savings can be calculated via the following formula:

Cost savings=(KW·hr supplied by second power source)*($/KW·hr of power supplied by the first power source)

In the case of the example outlined above, the costs savings for that week would be: (330 KW·hr) *(0.10$/KW·hr)=$33

As such, the output could indicate:

Cost Savings for the last 7 days=$33

Once this energy consumption information has been derived, it can be communicated to a user via an output module 88. In the specific non-limiting examples of implementation shown in FIGS. 6A through 6C, the bathing unit system 10 includes an output module 88 in communication with the controller 34. It is the output module 88 that is adapted for conveying the energy consumption information to the user.

Figure 6A:
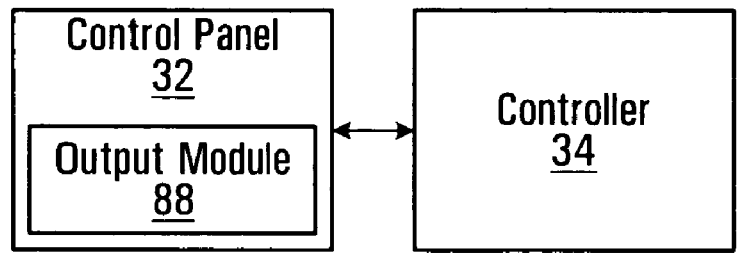
FIG. 6A-6C are block diagrams of various embodiments of an output module suitable for use with a controller in accordance with specific non-limiting examples of implementation of the present invention.

In the specific example of implementation shown in FIG. 6A, the output module 88 is a part of the control panel 32, and may include, for example, a visual display element and/or an audio element to respectively convey to a human operator visual and/or audible information indicative of the data associated with the use of the second power source. The visual display element could be, for instance, a liquid-crystal display (LCD) or one or more light-emitting diodes (LEDs). As such, the energy consumption information may be conveyed to a user in a visual format by displaying a message on a screen of the output module 88, or by turning ON (or OFF) an appropriate LED or causing an appropriate LED to blink.

Figure 6B:
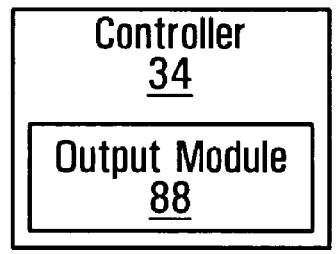

In another non-limiting embodiment shown in FIG. 6B, the output module 88 can be included within the housing of the controller 34 such that it is concealed from the user under typical operation. For example, the output module may simply be a dial that counts the number of hours the second power source 40 is in use. In such an embodiment, the output module 88 can be accessed by the user when the user desires to obtain the energy consumption information such as once a year for example.

In an alternative embodiment not shown in the drawings, the output module 88 is positioned remotely from both the control panel 32 and the controller 34. In such a case, the output module 88 may be positioned anywhere such that the information may be displayed anywhere in the bathing unit system 10 or in the proximity of the bathing unit system 10. For example, the energy consumption information may be displayed on a dedicated user interface, on a user operable console of the bathing unit system 10, on an external direct wire device or on a device positioned remotely from the controller 30. Depending on where the output module 88 is positioned, it should be understood that the controller 34 can be in either wireless or wire-line communication with the output module 88.

Figure 6C:
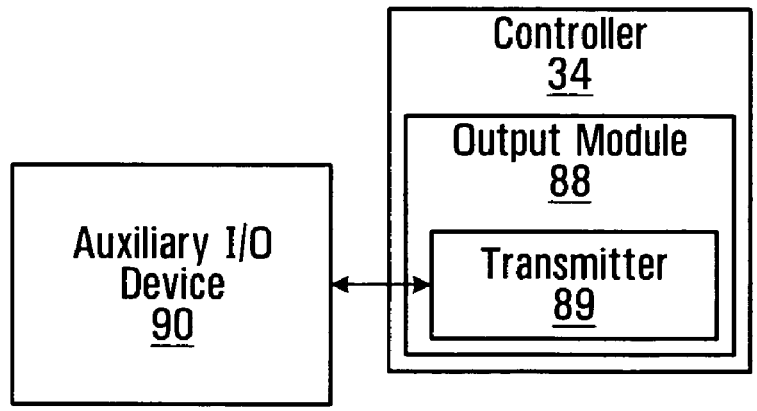

In another non-limiting embodiment shown in FIG. 6C, the output module 88 includes a transmitter or transceiver 89 operative to transmit a signal conveying information to a user indicative of the energy consumption information. The transmitter/transceiver 89 is operative to transmit the information over either one of a wireless link, such as a radio frequency (RF) link or infra-red (IR) link, or alternatively over a wire-line link. The transmitter/transceiver 89 communicates with an auxiliary I/O device 90, such as a laptop, a PDA or a cellular phone to convey information indicative of the error condition to a human operator. In a specific non-limiting implementation, the auxiliary I/O device 90 is in the form of a dedicated display module suitable to be positioned inside a house and in wireless communication with the transmitter/transceiver 89 of output module 88.

In yet another alternative embodiment, instead of conveying the energy consumption information to a user in an audio or visual format via an output module 88, the control unit 34 could store the information in the memory unit 56, such that a user could obtain the information by downloading it to an auxiliary I/O device 90, such as a PDA, cell phone or a laptop computer.

The above description of the embodiments should not be interpreted in a limiting manner since other variations, modifications and refinements are possible within the spirit and scope of the present invention. The scope of the invention is defined in the appended claims and their equivalents.

The invention claimed is:

1. A control system suitable for use with a bathing unit system having a water receptacle, said control system comprising:
   a) a heating module having a body defining a passage through which water can flow;
   b) a first power source operative for supplying power to said heating module;
   c) a second power source operative for supplying power generated from solar energy to said heating module, said second power source including an energy storage member adapted for establishing an electrical connection with a solar panel, said energy storage member being operative for storing energy collected from the solar panel;
   d) a controller in communication with said heating module, said first power source and said second power source, said controller being operative for:
      i) selecting one of said first power source and said second power source for supplying power to the heating module;
      ii) deriving energy consumption information associated with said second power source; and
      iii) releasing energy consumption information associated with the bathing unit system, said energy consumption information associated with the bathing unit system conveying the energy consumption information associated with said second power source relative to energy consumption information associated with said first power source.

2. A control system as defined in claim 1, wherein said energy consumption information associated with the bathing unit system conveys a number of hours said second power source has been in use in comparison to said first power source.

3. A control system as defined in claim 1, wherein said energy consumption information associated with the bathing unit system conveys a percentage of time said second power source has been in use in comparison to said first power source.

4. A control system as defined in claim 1, wherein said energy consumption information associated with the bathing unit system conveys the cost savings associated with the use of said second power source in comparison to said first power source.

5. A control system as defined in claim 1, wherein said control system includes a control panel comprising a display screen in communication with said controller, said controller being operative to display information conveying said energy consumption information associated with the bathing unit system on the display screen.

6. A control system as defined in claim 1, wherein said controller includes a memory unit, said controller being operative for storing said energy consumption information associated with said second power source in said memory unit.

7. A control system as defined in claim 1, said control system further comprising an output module establishing a communication link with an auxiliary I/O device, said output module transmitting a signal to the auxiliary I/O device over the communication link, the signal conveying said energy consumption information associated with the bathing unit system.

8. A control system as defined in claim 1, wherein said control system comprises a display screen in communication with said controller, said controller being operative to display information conveying said energy consumption information associated with the bathing unit system on the display screen.

9. A control system as defined in claim 6, wherein said energy consumption information associated with said second power source stored in said memory unit can be accessed by a user via downloading to an auxiliary I/O device.

10. A control system suitable for use with a bathing unit system having a water receptacle, said control system comprising:
    a) a heating module having a body defining a passage through which water can flow;
    b) a first power source operative for supplying power to said heating module;
    c) a second power source operative for supplying power generated from solar energy to said heating module, said second power source including an energy storage member adapted for establishing an electrical connection with a solar panel, said energy storage member being operative for storing energy collected from the solar panel;
    d) a controller in communication with said heating module, said first power source and said second power source, said controller including a memory unit and being operative for:
       i) deriving energy consumption information associated with said second power source; and
       ii) selecting one of said first power source and said second power source for supplying power to the heating module, at least in part on the basis of said energy consumption information associated with said second power source.

11. A control system as defined in claim 10, wherein said energy consumption information associated with said second power source is indicative of a number of hours said second power source has been in use.

12. A control system as defined in claim 10, wherein said energy consumption information associated with said second power source is indicative of a percentage of time said second power source has been in use in comparison with said first power source.

13. A control system as defined in claim 10, wherein said energy consumption information associated with said second power source is indicative of a cost savings associated with the use of said second power source.

14. A control system as defined in claim 10, wherein said control system includes a control panel comprising a display screen in communication with said controller, said controller being operative to display information conveying said energy consumption information associated with said second power source on the display screen.

15. A control system as defined in claim 10, wherein said energy consumption information associated with said second power source is stored in the memory unit.

16. A control system as defined in claim 15, wherein said energy consumption information associated with said second power source stored in said memory unit can be accessed by a user via downloading to an auxiliary I/O device.

17. A control system as defined in claim 16, said control system further comprising an output module for establishing a communication link with an auxiliary I/O device, said output module transmitting a signal to the auxiliary I/O device over the communication link, the signal conveying said energy consumption information associated with said second power source.

18. A control system as defined in claim 10, wherein said control system comprises a display screen in communication with said controller, said controller being operative to display information conveying said energy consumption information associated with said second power source on the display screen.

* * * * *